E. M. & A. G. RAYBURN.
SPEED CHANGING GEAR.
APPLICATION FILED JUNE 10, 1914.
1,138,415.
Patented May 4, 1915.
3 SHEETS—SHEET 2.
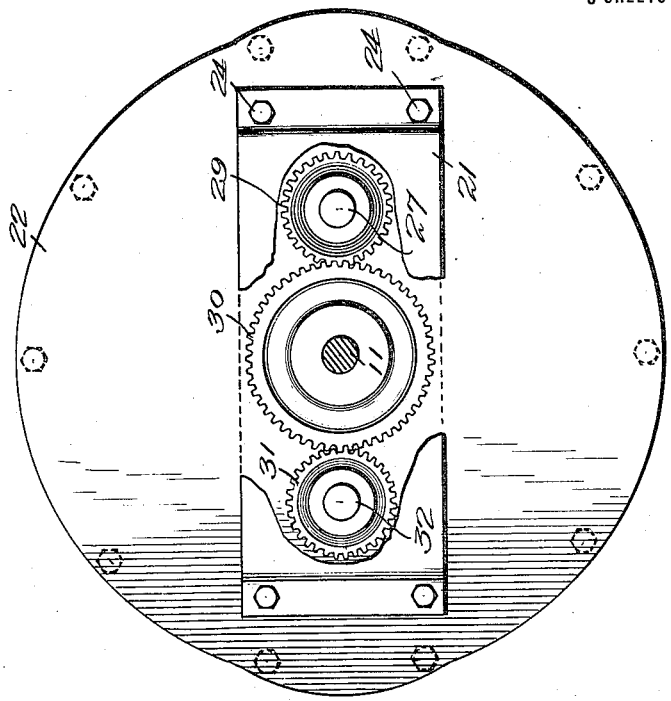
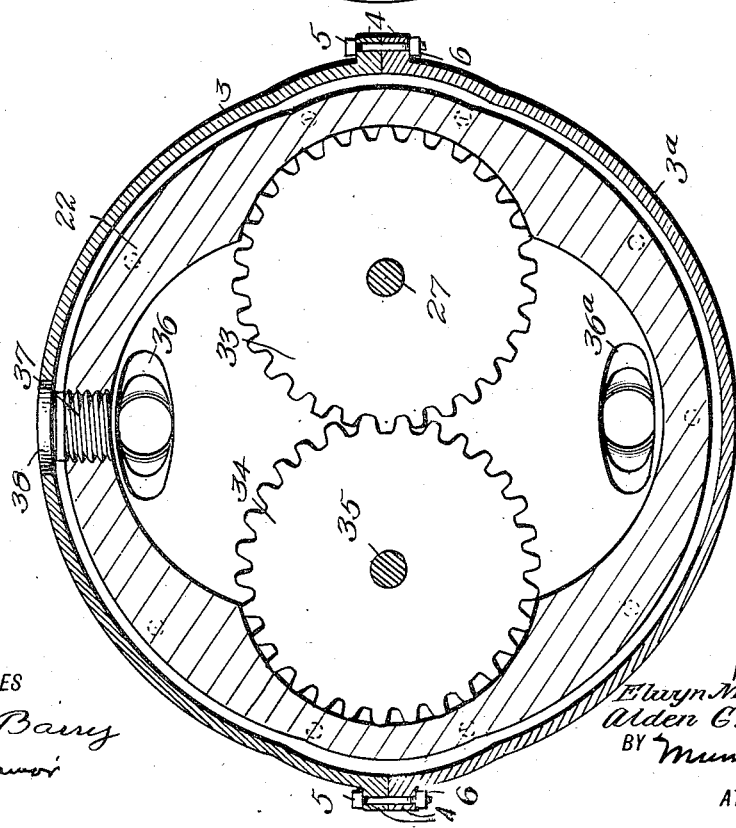
WITNESSES
F. C. Barry
C. E. Tramor
INVENTORS
Elwyn M. Rayburn
Alden G. Rayburn
BY Munn & Co.
ATTORNEYS

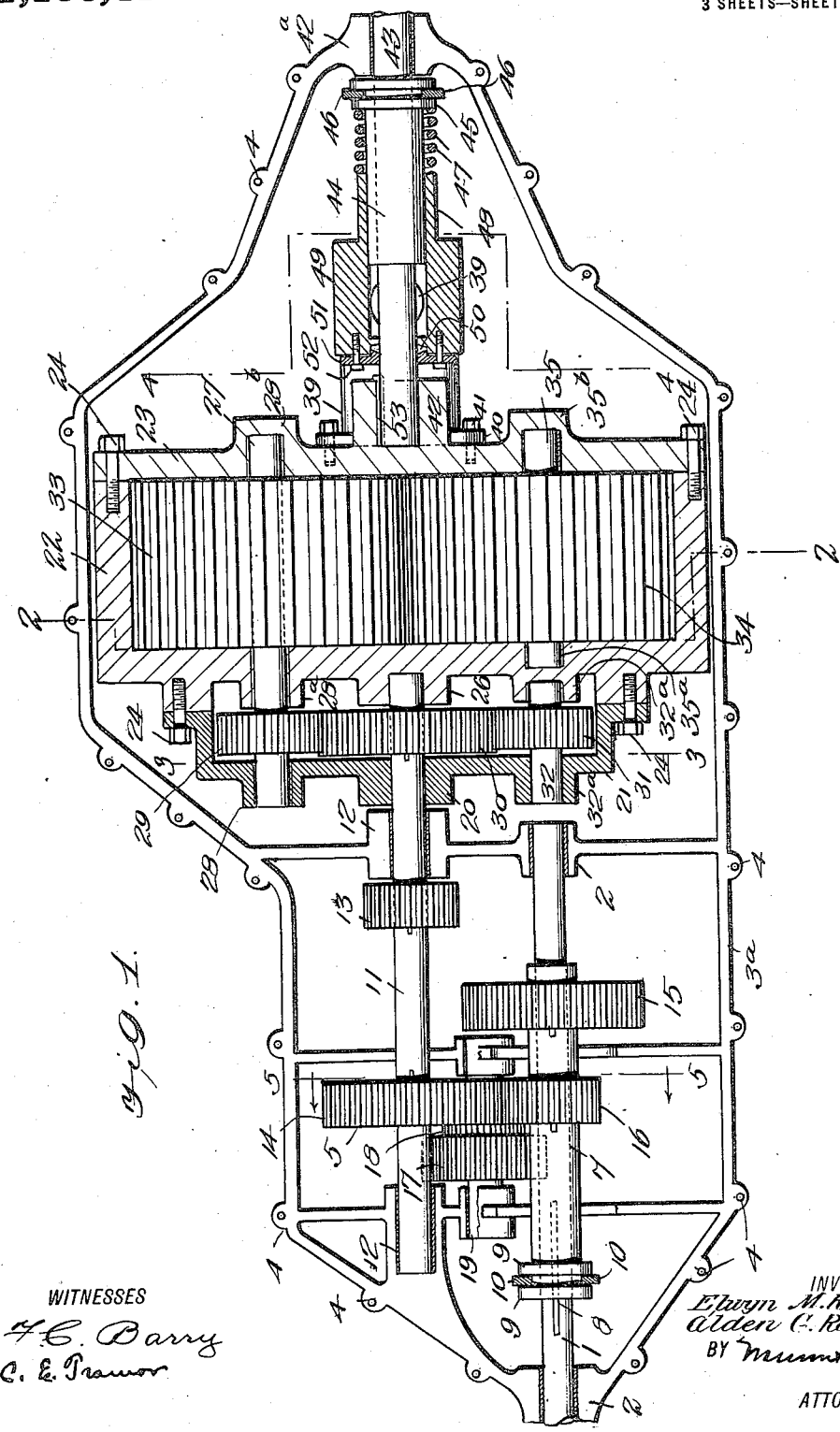

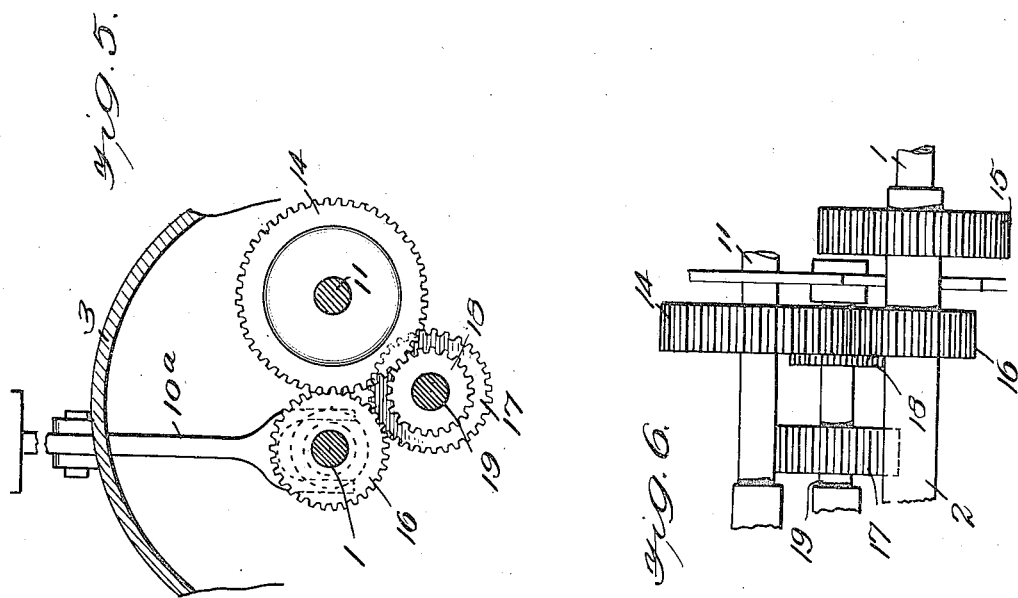

UNITED STATES PATENT OFFICE.

ELWYN M. RAYBURN AND ALDEN G. RAYBURN, OF SAUSALITO, CALIFORNIA.

SPEED-CHANGING GEAR.

1,138,415.　　　　　Specification of Letters Patent.　　　Patented May 4, 1915.

Application filed June 10, 1914. Serial No. 844,174.

*To all whom it may concern:*

Be it known that we, ELWYN M. RAYBURN and ALDEN G. RAYBURN, citizens of the United States, and residents of Sausalito, in the county of Marin and State of California, have made certain new and useful Improvements in Speed-Changing Gears, of which the following is a specification.

Our invention is an improvement in speed changing gears, and has for its object to provide a simple, inexpensive and flexible device of the character specified, for transmitting power from the power plant of the vehicle to the wheels, wherein the driven shaft is connected to a countershaft by means of a variable speed connection, and wherein the countershaft is connected to the driving shaft in such manner that the said shafts may be smoothly and gradually connected without any shock or jar.

In the drawings: Figure 1 is a top plan view with the upper section of the case removed, and with parts in section, Figs. 2, 3, 4 and 5 are sections on the lines 2—2, 3—3, 4—4 and 5—5, respectively, of Fig. 1, Fig. 5 looking in the direction of the arrows adjacent to the line, and Fig. 6 is a bottom plan view of the reversing mechanism.

In the present embodiment of the invention the transmission or driven shaft 1 is journaled in bearings 2, in a sectional casing, consisting of an upper section 3 and a lower section 3ª, the sections being provided with laterally extending registering perforated lugs 4, through which are passed bolts 5, and the bolts are engaged by nuts 6, to clamp the sections together.

A sleeve 7 is mounted to slide longitudinally of the shaft 1, being keyed thereto, as indicated at 8, and at one end the sleeve is provided with a pair of spaced ribs 9, for engagement by the arms 10 of a fork on a suitable operating lever 10ª, for shifting the sleeve. An intermediate or countershaft 11 is journaled in bearings 12 in the casing, and gear wheels 13 and 14 are keyed to the countershaft as shown. The sleeve 7 is provided with gear wheels 15 and 16, which are designed to mesh with the wheels 13 and 14 respectively of the shaft 11, to provide for low and high speeds respectively.

When the sleeve 7 is in the position of Fig. 1, that is with the gear wheels 14 and 16 intermeshing, the driven shaft will be driven on the low speed, while when the sleeve is shifted to cause the gears 13 and 15 to intermesh the driven shaft will be driven on the high speed. The reverse mechanism is obtained through a gear 18 on a shaft 19 arranged below and between the shafts 1 and 11, the gear 18 meshing with the gear 14 on the shaft 11.

A second gear 17 is arranged on the same shaft 19, and the gear 17 is designed to mesh with the gear 16 when the sleeve 7 is shifted in the proper direction. When the gear wheels 15 or 16 are meshing with the gear wheels 13 or 14 the shafts 1 and 11 are directly connected, while when the gear wheel 16 meshes with the gear wheel 17 the connection between the shafts 1 and 11 is indirect or reversed. The shaft 11 extends through a bearing 20 in one section 21 of a casing, the said casing comprising the section 21, a section 22, and a section 23, and the said casing 21—22—23 is rotatably mounted in the casing 3—3ª which is stationary.

The sections 21 and 23 are connected to the section 22, by means of screw bolts 24, and each of the sections is provided with three bearings. The shaft 11 is journaled in the bearing 20 of the section 21, and in a bearing 26 in the section 22. A shaft 27 is journaled in bearings 28—28ª and 28ᵇ in the three sections, and a gear wheel 29 is secured to the shaft in the casing 21. The said gear wheel 29 meshes with a gear wheel 30 on the shaft 11, and the gear 30 meshes with a gear wheel 31 on a shaft 32 which is journaled in bearings 32ª and 32ᵇ in the casings 21 and 22. A gear wheel 33 is secured to the shaft 27 within the casings 22 and 23, and a second gear wheel 34 is secured to a shaft 35, the said shaft being mounted in bearings 35ª and 35ᵇ in the casing 22—23. From an inspection of Fig. 2 it will be noted that the casing 22 is shaped to fit the gear wheels 33 and 34, so that while the said gear wheels may rotate with respect to the casing, they cannot move out of their relative position with respect to the casing.

It will be noted from an inspection of Fig. 3 that the casing 21 is secured to one head of the casing 22, and the gear wheels 29—30 and 31 are arranged between this casing or plate 21 and the adjacent head of the casing 22. There is a portion of the interior of the casing 22 not filled by the gear wheels 33 and 34 and this space is designed to be filled with oil, so that the gear wheels rotate at all times in oil.

Openings 36 and 36ª are provided at opposite sides of the point where the wheels 33 and 34 intermesh, and the said wheels divide the interior of the casing 22 into two equal compartments. The oil enters this compartment by way of the openings 36, and as the gear wheels 33 and 34 rotate, the oil is passed by the said wheels from above the point where they intermesh to below the said point and the oil is forced out from the opening 36ª.

A plug 37 is threaded into an opening in the periphery of the casing 22 for permitting the insertion of oil, and the casing 3—3ª is provided with an opening 38 at the plug, to permit removal and insertion of the plug. A pipe 39 is arranged transversely of the casing 23, the said casing being in fact the removable head of the casing 22, and the ends of the pipe are flanged, as indicated at 40, and are secured to the head 23 over the openings 36 and 36ª by means of machine bolts or screws 41.

As before stated the three casings 21—22 and 23 constitute in fact a single casing, each having three bearings. The third bearing 42 of the casing or head 23 is central, and the motor or drive shaft 43 is journaled in the bearings, and also in a similar bearing 42ª in the end of the sectional casing 3—3ª. A sleeve 44 is mounted on the shaft 43, and the said sleeve is provided with a pair of laterally spaced annular ribs 45 at its outer end.

The arms 46 of a fork on a suitable operating lever are engaged with the sleeve between the ribs, for moving the sleeve, and a coil spring 47 encircles the sleeve between the innermost rib of the pair, and the end of a nipple 48 which extends laterally outward from the center of the pipe 39. It will be noticed that at the center the pipe 39 is enlarged to form a cylinder 49, and the driving shaft 43 extends through the cylinder, the nipple 48 being a part of the cylinder.

The sleeve 44 is movable into and out of the cylinder, to close the bore of the pipe 39, completely or partially, in order to hinder the flow of the oil through the said pipe. The spring 47 normally presses the sleeve outward, and it must be moved inward by means of the lever. The sleeve is in fact a valve for controlling the communication through the pipe 39. The shaft 43 extends through a stuffing box 50 at the inner end of the cylinder, and a packing plate or nut 5 is secured to the cylinder at this point, by means of screw bolts 52.

The driving shaft 43 is keyed to the casing 21—22—23 by means of a key 53, and when the said shaft 43 rotates, the casing 21—22—23, the pipe 39 and connected parts, the shafts 27—35—32 and 28, the gears 29—30 and 31, and the gear wheels 33 and 34 rotate therewith.

The operation of the improved speed changing gear is as follows: When the driving shaft 43 rotates, the casing 21—22—23 rotates therewith, and were the gear wheels 33 and 34 unaffected by other conditions, the gear wheel 29 would roll around the gear wheel 30 without moving the same. With the sleeve 44 in the position of Fig. 1, this above mentioned state of affairs would obtain. As soon, however, as the motor is running freely, the sleeve 44 is gradually moved inward, and the flow of oil through the pipe 39 is hindered to a greater or less extent, depending upon the extent of movement of the sleeve, and when there is a hindrance to the flow of oil through the pipe there is more or less drag on the free movement of the wheels 33 and 34, and even the slightest amount of drag will restrain the free movement of the said wheels, so that the shaft 27 will be held, and the gear wheel 29 will rotate the gear wheel 30, thus driving the shaft 11.

With the gear wheels 13—14—15—16 in position of Fig. 1, the low speed is obtained, and by shifting the sleeve 7 the high speed may be also brought into operation, or the reverse as may be desired. In any event the driving shaft 43 is gradually and slowly connected to the countershaft 11 without any shock or jar, through the flexible connection made by the gears 33 and 34 and the oil.

It will be obvious that the driving shaft may be very gradually connected to the countershaft, thus eliminating all strain on the motor and on the vehicle. So long as there is no interruption to the free movement of the gear wheels 33 and 34 on each other, there will be no drag on the gear wheel 29, and the said wheel will rotate smoothly around the wheel 30 without moving the said wheel. Whenever, however, there is any hindrance to the free movement of the wheels 33 and 34 no matter how slight, there will be some drag on the wheel 29 and some movement on the wheel 30.

The invention consists in the connection between the driving shaft and the countershaft 11, such that normally the shafts rotate freely without moving each other, but wherein the shafts are connected in such manner, that they may gradually be coupled together.

It will be understood that any preferred form of variable speed connection may be used to connect the countershaft and the driven shaft. The gear wheels 15 and 16 are not necessarily on a single sleeve, but may be on separate sleeves if desired.

We claim:

1. A speed changing gear, comprising a stationary sectional casing, driving and driven shafts journaled in the casing at the opposite ends thereof and parallel with respect to each other, a countershaft journaled in the casing parallel with the driven shaft and adjacent thereto, and in alinement with the driving shaft, a substantially cylindrical casing arranged between the driving shaft and the countershaft, said casing having central recesses at its ends in which the driving and the countershaft are received, the driving shaft being keyed to the casing, shafts journaled in the casing at opposite sides of the center, a gear wheel secured to each of the said shafts within the cylindrical casing, said gear wheels meshing with each other at the center of the casing, and dividing the casing into separate compartments, a pipe arranged transversely of the end of the cylindrical casing adjacent to the driving shaft and communicating with the casing on opposite sides of the point of intermeshing of the gear wheels, said pipe having a cylinder at its center through which the driving shaft extends, a sleeve slidable on the driving shaft and movable into and out of the cylinder to close the pipe at the cylinder, means for moving the sleeve, a spring normally pressing the sleeve outward, one of the lateral shafts of the cylindrical casing being extended outside of the casing and lying alongside the countershaft in spaced relation, a gear wheel secured to the countershaft, a gear wheel secured to the extended end of the first-named shaft and meshing with the gear wheel of the countershaft, a counterpressure gear journaled in the casing on the opposite side of the gear wheel of the countershaft, means within the sectional casing for connecting the countershaft and the driven shaft to cause them to rotate in the same direction at different speeds, and other means for connecting the said shafts to cause them to rotate in opposite directions.

2. A speed changing gear, comprising a stationary sectional casing, driving and driven shafts journaled in the casing at the opposite ends thereof and parallel with respect to each other, a countershaft journaled in the casing parallel with the driven shaft and adjacent thereto, and in alinement with the driving shaft, a substantially cylindrical casing arranged between the driving shaft and the countershaft, said casing having central recesses at its ends in which the driving and the countershaft are received, the driving shaft being keyed to the casing, shafts journaled in the casing at opposite sides of the center, a gear wheel secured to each of the said shafts within the cylindrical casing, said gear wheels meshing with each other at the center of the casing, and dividing the casing into separate compartments, a pipe arranged transversely of the end of the cylindrical casing adjacent to the driving shaft and communicating with the casing on opposite sides of the point of intermeshing of the gear wheels, said pipe having a cylinder at its center through which the driving shaft extends, a sleeve slidable on the driving shaft and movable into and out of the cylinder to close the pipe at the cylinder, means for moving the sleeve, a spring normally pressing the sleeve outward, one of the lateral shafts of the cylindrical casing being extended outside of the casing and lying alongside the countershaft in spaced relation, a gear wheel secured to the countershaft, a gear wheel secured to the extended end of the first-named shaft and meshing with the gear wheel of the countershaft, a counterpressure gear journaled in the casing on the opposite side of the gear wheel of the countershaft, and releasable means for connecting the countershaft and the driven shaft.

3. A speed changing gear, comprising a stationary sectional casing, driving and driven shafts journaled in the casing at the opposite ends thereof and parallel with respect to each other, a countershaft journaled in the casing parallel with the driven shaft and adjacent thereto, and in alinement with the driving shaft, a substantially cylindrical casing arranged between the driving shaft and the countershaft, said casing having central recesses at its ends in which the driving and the countershaft are received, the driving shaft being keyed to the casing, shafts journaled in the casing at opposite sides of the center, a gear wheel secured to each of the said shafts within the cylindrical casing, said gear wheels meshing with each other at the center of the casing, and dividing the casing into separate compartments, a pipe arranged transversely of the end of the cylindrical casing adjacent to the driving shaft and communicating with the casing on opposite sides of the point of intermeshing of the gear wheels, said casing being adapted to contain oil, a valve for controlling the communication through the pipe, a spring normally pressing the valve to opened position, means for operating the valve, a gear wheel outside the casing and rigid with one of the gear wheels of the casing, a gear wheel on the countershaft with which the last named gear wheel meshes, and a changeable speed gear connection between the countershaft and the driven shaft.

4. A speed changing gear, comprising a driving shaft, a countershaft arranged in alinement therewith and in spaced relation, a casing keyed to the driving shaft between the shafts, gear wheels journaled in the casing and meshing with each other and dividing the interior of the casing into two compartments, said casing being adapted to contain oil, a gear wheel on the countershaft, a gear meshing therewith and rigid with one of the wheels in the casing, a by-pass pipe connecting the compartments of the casing, means for controlling the flow of oil through the by-pass pipe, a driven shaft journaled parallel with the countershaft, and a changeable speed gear connection between the countershaft and the driven shaft.

5. A speed changing gear, comprising a driving shaft, a countershaft in alinement therewith and in spaced relation, a casing keyed to the driving shaft between the shafts, gear wheels journaled in the casing and meshing with each other and dividing the interior of the casing into two compartments, said casing being adapted to contain oil, a gear wheel on the countershaft, a gear meshing therewith and rigid with one of the wheels in the casing, a by-pass pipe connecting the compartments of the casing, means for controlling the flow of oil through the by-pass pipe, a driven shaft journaled parallel with the countershaft, and a changeable speed gear connection between the countershaft and the driven shaft.

6. A speed changing gear, comprising a driving shaft, a countershaft in alinement with the driving shaft, a casing secured to the driving shaft between the shafts, gear wheels journaled in the casing and meshing with each other and dividing the interior of the casing into two compartments, said casing being adapted to contain oil, a by-pass between the compartments, means for controlling the by-pass, a planetary connection between one of the gear wheels in the casing and the countershaft, a driven shaft adjacent to the countershaft, and a variable speed connection between the countershaft and the driven shaft.

7. A speed changing gear, comprising a driving shaft and a driven shaft, a casing secured to the driving shaft, gear wheels journaled in the casing on opposite sides of the driving shaft and meshing with each other and dividing the interior of the casing into two compartments, said casing being adapted to contain oil, a by-pass between the compartments, means for controlling the by-pass, and a planetary gear connection between one of the gear wheels of the casing and the driven shaft.

ELWYN M. RAYBURN.
ALDEN G. RAYBURN.

Witnesses:
  FRANCES ANNE FIELD,
  GEO. DIAS.